United States Patent [19]
Stettler et al.

[11] 3,969,892
[45] July 20, 1976

[54] COMBUSTION SYSTEM

[75] Inventors: Richard J. Stettler; Albert T. Verdouw, both of Indianapolis, Ind.

[73] Assignee: General Motors Corporation, Detroit, Mich.

[22] Filed: Nov. 26, 1971

[21] Appl. No.: 202,191

[52] U.S. Cl. .................. 60/39.51 R; 60/39.52; 60/39.65; 60/39.66; 60/DIG. 11; 431/116
[51] Int. Cl.² ............................................ F02C 7/10
[58] Field of Search............ 60/39.65, 39.66, 39.52, 60/39.51; 431/116

[56] References Cited
UNITED STATES PATENTS

| | | | |
|---|---|---|---|
| 2,502,878 | 4/1950 | Newcombe | 60/39.65 X |
| 2,677,236 | 5/1954 | Grinsted | 60/39.52 X |
| 2,718,754 | 9/1955 | Lewis | 60/39.65 |
| 3,323,304 | 6/1967 | Llobet | 60/39.52 X |
| 3,656,298 | 4/1972 | Wade | 60/39.65 |

*Primary Examiner*—Clarence R. Gordon
*Attorney, Agent, or Firm*—Paul Fitzpatrick

[57] ABSTRACT

A combustion system with provisions to minimize undesired exhaust products including carbon monoxide, incompletely burned fuel, and oxides of nitrogen. Air entering the combustion zone of the combustion apparatus is mixed with a relatively large amount of recirculated combustion products, preferably about twice the weight of the fresh air entering the combustion zone. The combustion products which are recirculated are cooled by heat exchange with air flowing to a dilution zone of the combustion apparatus where the combustion products and air are mixed to provide the high temperature gas output of the system which is the motive fluid of a gas turbine.

The recirculated combustion products are cooled to reduce temperature in the combustion zone and thereby nitrogen oxide formation and the heat extracted from the recirculated combustion products is transferred to the dilution air. The combustion products delivered from the combustion zone to the dilution zone may be diverted ahead of or after the heat exchange. The additional air may be mixed with the recirculated combustion products either before or behind the heat exchanger.

13 Claims, 5 Drawing Figures

INVENTORS
Richard J. Stettler &
Albert J. Verdouw
BY
Paul Fitzpatrick
ATTORNEY

INVENTORS
Richard J. Stettler &
Albert J. Verdouw
BY
Paul Fitzpatrick
ATTORNEY

COMBUSTION SYSTEM

Our invention is directed to combustion systems and combustion apparatus, particularly to such apparatus suited for use in gas turbine engines and other installations in which combustion products are generated at quite high temperatures, and especially those of compact arrangement.

By the nature of the usual gas turbine combustion process, properly designed gas turbine combustors ordinarily have a very low output of unburned hydrocarbons and of carbon monoxide. However, since the combustion takes place at rather high temperatures, there is a considerable tendency for oxygen and nitrogen molecules to become disassociated and to recombine to form an oxide of nitrogen. These oxides of nitrogens are regarded as atmospheric pollutants.

By and large the $NO_x$ problem is intensified if a gas turbine engine includes a regenerator which heats the combustion air by heat exchange with the turbine exhaust, resulting in higher temperatures in the combustion zone of the combustion apparatus. Such regenerators, however, are highly regarded as a means to reduce the fuel consumption of gas turbines.

Our invention is based upon the fact that nitric oxide is formed in the combustion process by the fixation of nitrogen and excess oxygen at elevated reaction temperatures. The combustion zone in a gas turbine is typically somewhat rich in oxygen over the stoichiometric ratio. It can be shown by chemical equilibrium considerations that the concentration of nitric oxide can be reduced by decreasing the available excess oxygen concentration or by reducing the reaction temperature.

In this connection, according to our invention, inert combustion products from the downstream end of the primary or combustion zone are recirculated into the combustion zone in large quantities, thereby greatly reducing the oxygen concentration. Simple recirculation, however, is not effective to reduce temperature and therefore our invention also involves cooling the recirculated combustion products so as to reduce quite significantly the temperature in the combustion zone. The recirculated combustion products are cooled by heat exchange with dilution air, which is air added to the combustion products before their delivery to the turbine or other point of use. Thus, the heat energy is not lost and the operating efficiency is not adversely affected, but the temperature of the recirculated air and thereby the temperature in the combustion zone is very markedly reduced. In a regenerative engine operating at high temperatures, this reduction may be as much as 800°F.

The principal objects of our invention are to provide practical and efficient gas turbine combustion apparatuses with low output of undesired exhaust components, particularly nitrogen oxides, to improve the emission characteristics of gas turbine engines and other continuous combustion devices, and to provide simple and practical structures for recirculating cooled combustion products to the combustion zone in a combustion apparatus.

The nature of our invention and its advantages will be more clearly apparent from the succeeding detailed description of preferred embodiments of the invention and the accompanying drawings thereof. Referring to the drawings.

Figure 1:
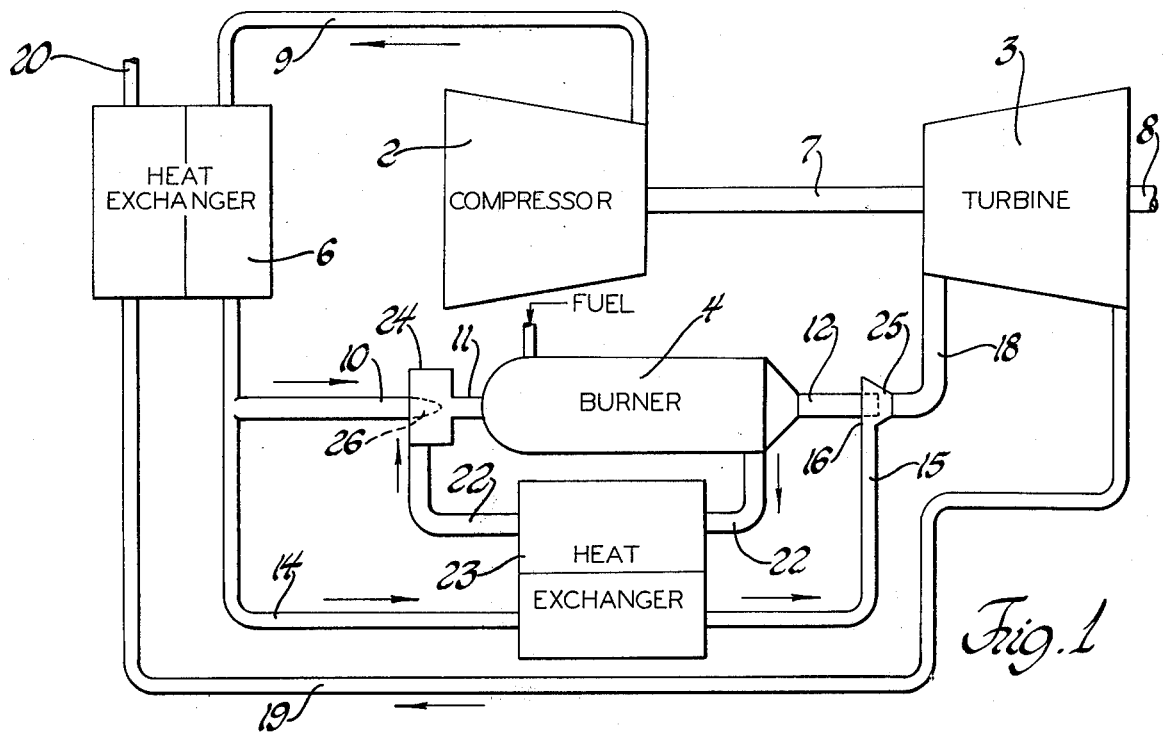
FIG. 1 is a schematic diagram of a gas turbine power plant incorporating the invention.

FIG. 1 illustrates a conventional gas turbine power plant, the principal elements of which are a compressor 2, a turbine 3, a burner or combustion apparatus 4, and a heat exchanger 6 serving as a regenerator. The turbine drives the compressor through a shaft 7 and may drive a power output shaft 8. If the turbine drives the power output shaft it may be a single shaft type with a single turbine rotor or a two shaft type, in which there are effectively two turbines, one driving shaft 7 and one driving shaft 8. The heat exchanger 6 is optional, but is highly desirable as a means of improving the fuel economy or efficiency of the power plant.

In operation, the compressor draws air from the atmosphere, compresses it, discharges it through duct 9 and one pass of the heat exchanger 6, and delivers part of the compressed air through duct 10 and an air entrance 11 into the combustion zone of the burner 4, in which zone fuel is burned in the compressed air to heat the motive fluid for the turbine. The resulting combustion products, delivered through a duct 12, are mixed with the remainder of the output of the compressor which flows through 14, 15 ducting to a dilution or mixing zone 16 which may, as in conventional practice, be a part of the burner 4. The combustion products, mixed with the additional air to reduce the temperature to the level required by the turbine, flows through the ducting indicated schematically at 18 into the turbine means from which it is exhausted. In the regenerative engine the exhaust is conducted through a duct 19, through the other pass of the regenerator 6, and to an atmospheric outlet 20.

The power plant as so far described may be considered to be conventional. Our invention is incorporated into the system by added structure including a return flow means or recirculation conduit 22 which extends from the outlet end of the primary combustion zone or burner back into the burner inlet 11. The invention also comprises the provision of a second heat exchanger 23 through one pass of which the recirculation flow passes and through the other pass of which the dilution air flows from duct 14 to duct 15.

Another new element included is a jet pump 24 into which the primary combustion air is delivered from the compressor through a nozzle 26 so that the incoming air energizes and entrains the recirculated combustion products, thus pumping the combustion products through conduit 22 and back into the burner air entrance.

Another feature of the invention, which may or may not be present as desired, lies in an arrangement of the mixer 16 to serve as a jet pump in which the dilution air delivered through conduit 15 passes through an annular nozzle 25 so that this acts to pump the combustion products out of the primary combustion zone and into the ducting 18. Use of such a jet pump may be desirable if pressure loss of the dilution air in the heat exchanger and ducting is significantly less than that of the combustion products in the burner and associated apparatus. It may be that the combustion products in duct 12 and the dilution air in duct 15 will be approximately the same pressure and my be mixed without any pumping action.

As with all gas turbine combustion apparatus, the pressure losses must be kept as low as feasible for efficient operation of the power plant.

The burner 4 in the arrangement illustrated in FIG. 1 may be a separate unit from the mixer 16 and may be of generally conventional gas turbine combustion chamber structure except that the dilution is accomplished in a separate mixer 16. The mixer may be structurally united with the burner according to more usual combustion chamber practice if desired, as as will be more apparent in connection with the discussion of FIG. 4. Representative gas turbine combustion devices are illustrated by U.S. patents to Conklin et al. U.S. Pat. No. 3,027,717, Apr. 3, 1962 and Hayes, U.S. Pat. No. 3,064,425, Nov. 20, 1962.

The heat exchanger 23 is preferably of the type in which the heat is conducted through a wall separating the hot and cold gas paths. The heat exchanger 6 may be of that type, but it may be preferable for it to be a rotary regenerator.

It is obvious that some other pumping means than the jet pump 24 may be employed to insure the recirculation of the combustion products, but the jet pump seems best adapted to this particular requirement.

Figure 2:
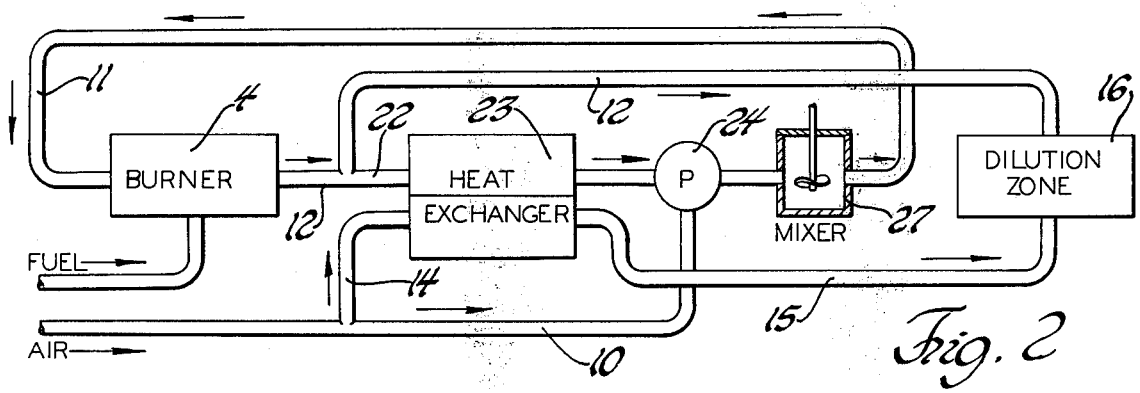
FIG. 2 is a schematic diagram of a combustion system involving a second embodiment of the invention.

FIG. 2 illustrates schematically a combustion apparatus similar in most respects to that of FIG. 1. FIG. 2, however, illustrates the pump 24 as being separate from a mixer 27, which is shown as an additional element, and omits the jet pump feature 26 of the mixer or dilution zone 16. Also, the jet pump is at the outlet of the heat exchanger rather than the inlet to the burner.

As illustrated in FIG. 2, the compressor discharge line 10 enters the pump 24, which is compatible with its being a jet pump as in FIG. 1. Obviously, if the pump 24 is of a type other than a jet pump, the line 10 may enter the mixer 27 rather than pump 24. In practice, the pump may be a sufficient mixer, but some structure such as a long flow path or some means to promote mixing of the air and combustion products may be desirable to cause the mixture of air and combustion products entering the burner to be homogeneous and thereby minimize the occurrence of hot spots in the burner. For a given average temperature in the combustion apparatus the production of oxides of nitrogen is least when the temperature is uniform. Nonuniformity of temperature, resulting in hot and cold zones, increases the amount of the nitrogen-oxygen reaction.

In FIGS. 1 and 2, the combustion products discharged from the burner through duct 12 go to the dilution zone and thence to the turbine without passing through the heat exchanger 23. The compressed air that is added to the recirculating combustion products is supplied downstream of the heat exchanger 23 hot gas pass.

Figure 3:
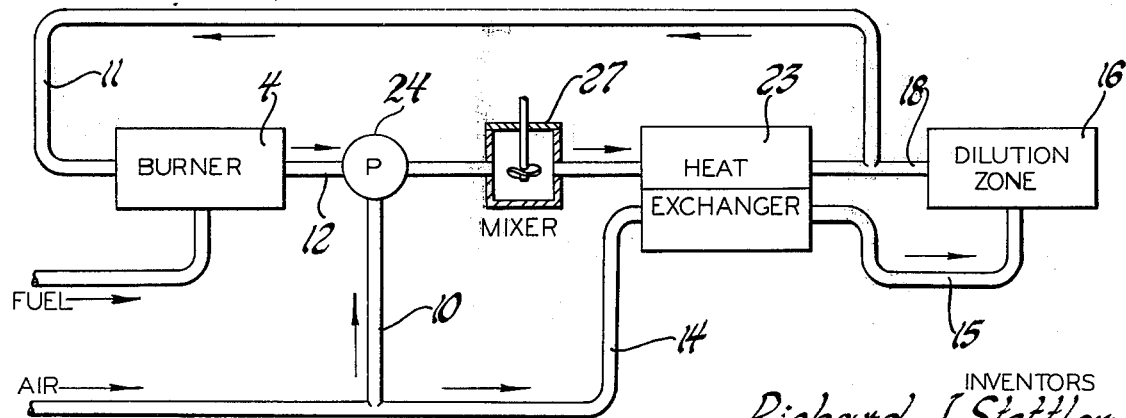
FIG. 3 is a schematic diagram of a combustion system which is a third embodiment of the invention.

FIG. 3 illustrates a different arrangement, which has some advantages, but which on the whole is considered to be less advantageous than that of FIG. 2. The significant difference of FIG. 3 from FIG. 2 is that all of the output of the burner goes through the heat exchanger 23 and that the make-up air is added ahead of the heat exchanger, flowing through the heat exchanger in the same pass as the combustion products.

Since the parts in FIG. 3 have numbers corresponding to those in FIG. 2 and the only difference in the system or circuit is the introduction of the additional combustion air to the recirculated air ahead of the regenerator rather than downstream of the exchange, the nature of the system should be clear.

As to the relative merits of these two arrangements, it may be pointed out that the form of FIG. 2 rquires a smaller heat exchanger, which may be quite significant in installations where compactness is a virtue. On the other hand, the apparatus of FIG. 3 maintains a considerably lower temperature in the heat exchanger, which means that the heat exchanger may be made of material of lower quality and cost. The heat exchanger may be reduced in volume if the dilution air flow is split, with part of it by-passing the heat exchanger, as by a by-pass connecting ducts 14 and 15 in FIG. 1 or a similar by-pass in FIGS. 2 and 3.

It will be obvious that the combustion systems of FIGS. 2 and 3 may be connected in a gas turbine system as shown in FIG. 1.

FIGS. 1 through 3 disclose variations of the system in a schematic manner. The components, as indicated in the schematics, may be separate pieces of equipment connected by external ducting, but for many installations it is highly desirable to integrate the combustion apparatus and heat exchanger for the dilution air along with the recirculation duct in a compact unitary assembly. Such an apparatus would be suitable for incorporation in gas turbines of modest size for vehicle propulsion or other purposes.

Figure 4:
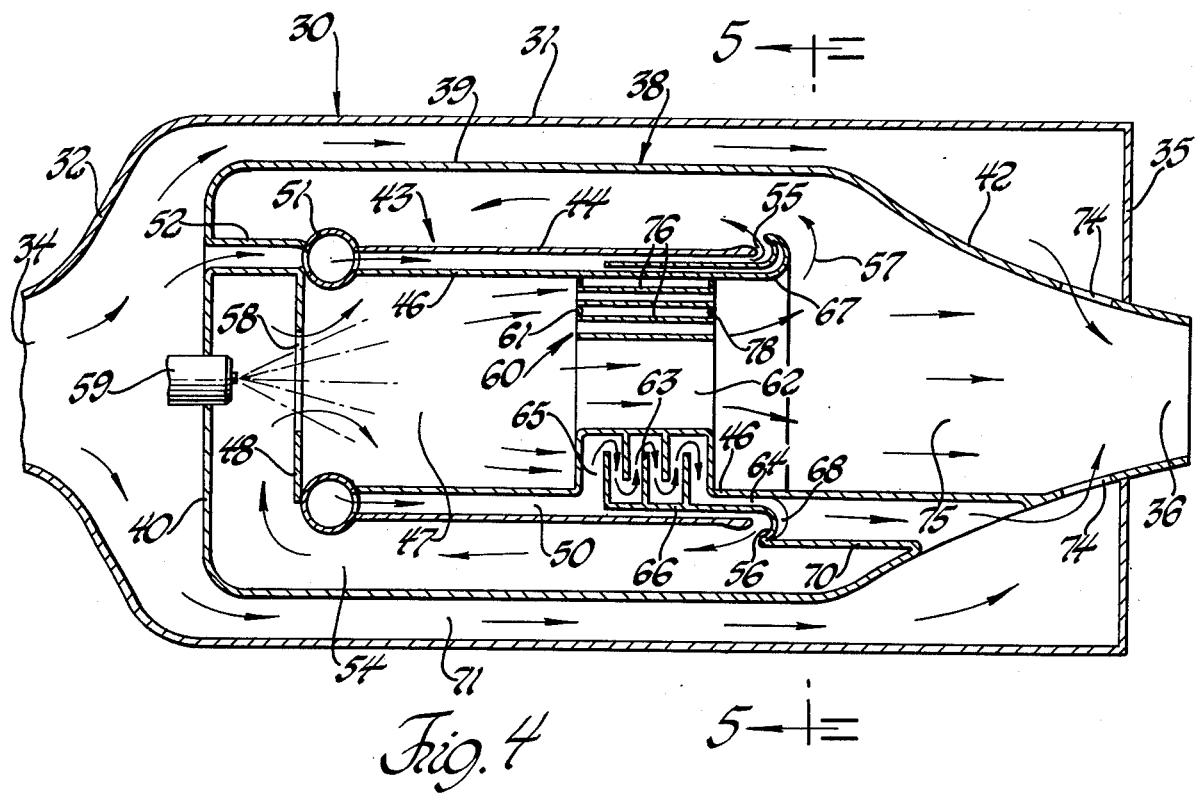
FIG. 4 is a longitudinal sectional view of a unitary combustion apparatus incorporating the invention.
Figure 5:
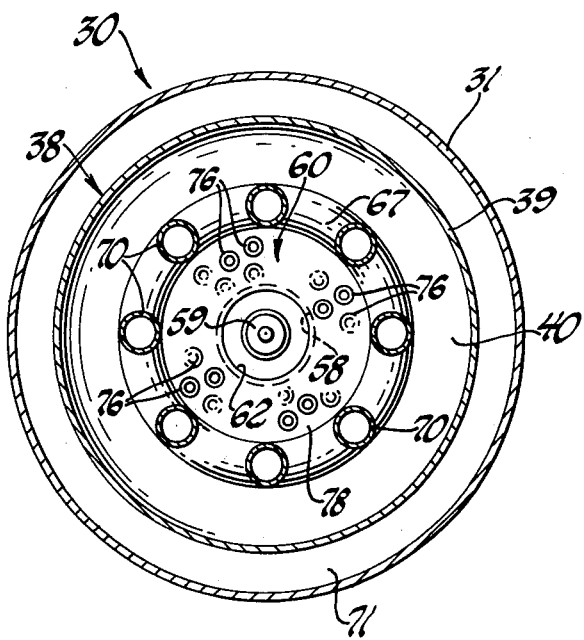
FIG. 5 is a cross section of the same taken on the plane indicated by the line 5—5 in FIG. 4.

FIGS. 4 and 5 show an example of an integrated structure embodying the principles of the invention. The combustion apparatus 30 of FIGS. 4 and 5 includes an outer casing 31, shown as cylindrical in cross section, although it may be of any desired cross section. The casing includes an inlet or upstream end 32 defining the air inlet or air entrance 34 through which compressed air from the compressor of the engine or other suitable source, which may or may not be heated in a regenerator, enters the combustion apparatus. The downstream end of casing 31 is closed by a wall 35 through which the discharge duct or combustion products outlet 36 of the combustion apparatus extends. Inlet 34 may correspond to duct 10 in FIG. 1 and outlet 36 to ducting 18 in FIG. 1, for example, and may continue to a turbine as indicated generally in FIG. 1.

Mounted within the casing 31 is a combustor and heat exchanger assembly 38. This assembly includes an inner casing 39 preferably of circular cross section including a front or upstream wall 40 and a converging discharge section 42 which terminates in the outlet 36. Any suitable additional support (not illustrated) may be provided for the inner casing.

Mounted within the inner casing is a combustion liner 43, the side wall of which is a double-walled structure defined by an outer wall 44 and an inner wall 46. This also is preferably of circular cross section. Combustion takes place in the combustion zone or space 47 bounded by the wall 46 and by an annular baffle or forward wall 48. The walls 44 and 46 define between them annular duct 50 for combustion and dilution air, which flows in the downstream direction through the duct as indicated by the arrows. The annular duct 50 is supplied with air from a toroidal manifold 51 disposed adjacent the baffle 48 at the forward end of the combustion liner. Manifold 51 in turn is supplied with fresh compressed air through a ring of tubes 52, preferably eight in number, which extend through the front wall 40 and into the manifold 51. These tubes also support the liner 43.

The annular space 54 between the walls 39 and 44 provides a recirculation duct for combustion products mixed with some of the fresh air supplied through the duct 50. The recirculating air is pumped by a jet pump energized by the incoming air, this jet pump comprising a redirected or retroverted annular nozzle 55 defined between the terminus of wall 44 and an outwardly and forwardly curved flange 56 located at the downstream end of wall 46. The forwardly directed air issuing from the nozzle 55 entrains combustion products flowing from the combustion zone 46 adjacent the inner surface of the combustion liner, causing this to reverse direction and flow outwardly and forwardly as indicated by the arrow 57 and thence forward through the duct 54. The mixture of fresh air and recirculated combustion products then flows between the tubes 52 and through the opening 58 in baffle 48 into the combustion zone 47.

A fuel nozzle 59, which may be of usual type delivering a conical spray of atomized fuel, is mounted in the wall 40 and supplied from a suitable source (not illustrated). The fuel is sprayed through the opening 58 into combustion zone 47 where it combines with oxygen in the air-combustion products mixture. The combustion may be initiated by a suitable igniter (not illustrated).

An annular heat exchanger 60 is mounted on the inside of inner wall 46 downstream of the combustion zone 47, the heat exchanger occupying about two-thirds of the diameter of the wall 46 and having an internal wall 62 defining a passage through the center of the heat exchanger. The heat exchanger cools the combustion products destined for the recirculation duct 54 by transfer of heat to the dilution air. As illustrated the heat exchanger 60 is of a tubular cross-flow type having parallel tubes 76 extending from an annular front wall 61 to an annular rear wall 78. These tubes conduct combustion products through the heat exchanger. Referring to the lower part of FIG. 4, part of the dilution air is diverted from the annular passage 50 into annular entrance 65 of the heat exchanger. As shown, annular baffles 63 provide a zigzag radially in and out course for the dilution air, which leaves the heat exchanger through an annular outlet 64 between the downstream portion of the inner wall 46 and an annular wall 66 which separates the heat exchanger from the conduit carrying fresh air to the nozzle 55. The recurved downstream end 56 of the wall 66 defines one boundary of the jet pump nozzle 55. The recurved wall portion 67 of wall 46 defines with the flange 56 an annular outlet manifold 68 of crescent-shaped cross section.

The dilution air passed through the heat exchanger is discharged from the combustion liner through a ring of preferably eight parallel discharge tubes 70 which also serve to support the rear end of the combustion liner in the inner casing 39. The dilution air which passes through the heat exchanger and tubes 70 is mixed with additional dilution air flowing through the combustion liner jacket space 71 between the casing 31 and 39, and the total of the dilution air flows into the outlet 36 through large ports 74 which cause the air to enter radially and mix with the combustion products flowing into the exhaust through the space 75 downstream of heat exchanger 60.

In this structure some of the dilution air by-passes the heat exchanger 60. It is, however, heated to some extent and takes up some heat from the recirculated gases flowing through duct 54 by heat transfer through the wall 39; which heat transfer, however, is not considered to be adequate for the desired emission control of the combustion chamber under relatively high temperature conditions. The additional cooling of the recirculating gas in duct 54 by the dilution air in passage 71 is helpful, however.

Heat exchanger 60 is a common type of heat exchanger and the details are not a significant part of the invention; therefore, it will not be further described.

Typically, it is considered desirable that the amount of combustion products entrained by the air issuing from jet nozzle 55 be about twice the weight of the entering fresh air, this being defined as a recirculation ratio of two. In other words, for each pound of fresh air entering the combustion zone, two pounds of combustion products are recirculated to the entrance at 58. By virtue of the recirculation and cooling of the recirculated air, the combustion apparatus may be run at a 3000°F. reaction temperature although the fuel-air ratio is stoichiometric, which would otherwise lead to a temperature of the order of 3800° or 3900° with entering air at 1000°F., which is typical in a regenerated gas turbine engine. Note that the location of the heat exchanger 60 is such that the heat is transferred from the portion of the gases flowing from the combustion zone which is to be recirculated rather than to the portion which flows directly to the outlet 36.

An advantage of the structure shown in FIG. 4 is the considerable length of the recirculation passage 54, which allows for thorough mixing of the incoming air and the combustion products. This also is encouraged by the turbulence generated by flowing between tubes 52 and through the opening 58 in baffle 48.

The heat which is taken from the recirculated combustion products is not lost to the cycle, since the heat is simply transferred to the dilution air which is mixed with the combustion products in forming the motive fluid which is discharged through the outlet 36 to a turbine or other user.

It should be clear to those skilled in the art from the foregoing that our invention may be embodied in a system having distributed components, or in a compact unitary structure such as that shown in FIGS. 4 and 5, and that various arrangements for recirculation of the combustion products with transfer of heat to the dilution air may be employed in implementing the principles of the invention.

The detailed description of preferred embodiments of the invention for the purpose of explaining the principles thereof is not to be considered as limiting or restricting the invention, since many modifications may be made by the exercise of skill in the art.

We claim:

1. A gas turbine engine comprising, in combination, rotary air compressor means adapted to deliver substantially unadulterated compressed air, combustion apparatus supplied with the said air by the compressor means, and turbine means supplied with motive fluid by the combustion apparatus and connected to drive the compressor means, characterized by combustion apparatus adapted to deliver hot combustion products relatively free of contaminants including means defining a combustion zone, means defining a dilution zone downstream of the combustion zone, means for directing some of the said air from the compressor as unadulterated combustion air to the combustion zone and some as unadulterated dilution air to the dilution zone, means for recirculating combustion products from the combustion zone to the combustion zone by-passing the dilution zone, and means for transferring heat from the recirculating combustion products to the said dilution air flowing to the dilution zone.

2. A gas turbine engine comprising, in combination, rotary air compressor means adapted to deliver substantially unadulterated compressed air, combustion apparatus supplied with the said air by the compressor means, and turbine means supplied with motive fluid by the combustion apparatus and connected to drive the compressor means, characterized by combustion apparatus adapted to deliver hot combustion products relatively free of contaminants including means defining a combustion zone, means defining a dilution zone downstream of the combustion zone, means for directing some of the said air from the compressor as unadulterated combustion air to the combustion zone and some as unadulterated dilution air to the dilution zone, means for recirculating combustion products of mass in excess of the mass of air supplied from the compressor means to the combustion zone from the combustion zone to the combustion zone by-passing the dilution zone, and means for transferring heat from the recirculating combustion products to the said dilution air flowing to the dilution zone.

3. A gas turbine engine comprising, in combination, rotary air compressor means adapted to deliver substantially unadulterated compressed air, combustion apparatus supplied with the said air by the compressor means, turbine means supplied with motive fluid by the combustion apparatus and connected to drive the compressor means, and regenerator means for transferring heat from the turbine exhaust to the compressor discharge, characterized by combustion apparatus adapted to deliver hot combustion products relatively free of contaminants including means defining a combustion zone, means defining a dilution zone downstream of the combustion zone, means for directing some of the said air from the compressor as unadulterated combustion air to the combustion zone and some as unadulterated dilution air to the dilution zone, means for mixing regenerator discharge air with combustion products diverted from the combustion zone by-passing the dilution zone and directing the mixture to the combustion zone, and means for transferring heat from the recirculating air and combustion products mixture to the said dilution air flowing to the dilution zone.

4. A combustion system comprising, in combination, a burner, means for supplying fuel and compressor means for supplying substantially undiluted combustion air under pressure to the burner, outlet means for conducting combustion products from the burner to a user, return flow means for returning a first portion of the combustion products to the burner from the outlet means and mixing the combustion products with the combustion air supplied to the burner, means for supplying dilution air under pressure to the outlet means, means for mixing the dilution air with the remaining portion of the combustion products, the mixing means including a jet pump energized by the dilution air, and heat exchanger means for cooling the returning combustion products by heat transfer to the dilution air.

5. A combustion system comprising, in combination, compressor means for supplying substantially undiluted air under pressure, means for dividing the air into a combustion stream and a dilution stream; a combustion burner having fuel inlet means, an air inlet, and a combustion products outlet; means for dividing the flow from the outlet into a motive fluid stream and a recirculating stream such that the recirculating stream is of greater mass than the motive fluid stream; heat exchange means for transferring heat from the recirculating stream to the dilution stream; means for mixing the combustion stream and the recirculating stream and directing the resulting mixture into the air inlet; and means for mixing the dilution stream downstream of the heat exchange means with the motive fluid stream and directing the resulting mixture to a user.

6. A system as recited in claim 5 in which the heat exchange means is downstream from the dividing means.

7. A system as recited in claim 5 in which the heat exchange means is upstream from the dividing means.

8. A combustion system comprising, in combination, compressor means for supplying substantially undiluted air under pressure, means for dividing the air into a combustion stream and a dilution stream; a combustion burner having fuel inlet means, an air inlet, and a combustion products outlet; means for dividing the flow from the outlet into a motive fluid stream and a recirculating stream such that the recirculating stream is of greater mass than the motive fluid stream; heat exchange means for transferring heat from the recirculating stream to the dilution stream; means for mixing the combustion stream and the recirculating stream and directing the resulting mixture into the air inlet; means for mixing the dilution stream downstream of the heat exchange means with the motive fluid stream and directing the resulting mixture to a user; and means for heating the supplied air by heat exchange from the resulting mixture exhausted from the user.

9. A system as recited in claim 8 in which the supplying means is a rotary compressor and including a user which is a rotary driving the compressor.

10. A combustion system comprising, in combination, means for supplying air under pressure, means for dividing the air into a combustion stream and into first and second dilution streams; a combustion burner having fuel inlet means, an air inlet, and a combustion products outlet; means for dividing the flow from the outlet into a motive fluid stream and a recirculating stream such that the recirculating stream is of greater mass than the motive fluid stream; means for mixing the combustion stream and the recirculating stream and directing the resulting mixture into the air inlet; first heat exchange means for transferring heat from the recirculating stream to the first dilution stream upstream from the mixing means; second heat exchange means for transferring heat from the recirculating stream to the second dilution stream downstream from the mixing means; and means for mixing the dilution streams downstream of the heat exchange means with the motive fluid stream and directing the resulting mixture to a user.

11. A combustion apparatus comprising, in combination, casing means defining an inlet for compressed air and defining an outlet for combustion products; a combustion liner mounted within the casing means, the combustion liner having upstream and downstream ends and having a double wall extending between the ends, the space between the walls being a duct for compressed air, the duct terminating in a nozzle at the downstream end of the liner discharging into a recirculation flow duct defined between the combustion liner wall and the casing means; the nozzle serving as the impelling means of a jet pump adapted to circulate combustion products flowing from the combustion liner into the recirculating duct; the combustion liner having an entrance for the air and combustion products returned through the recirculation duct at the upstream end of the combustion liner and defining a combustion zone adjacent the upstream end of the liner; means for injecting fuel into the combustion zone; an annular heat exchanger mounted on the inside of the combustion liner wall having an opening through the center of the heat exchanger for combustion products flowing to the said outlet and having means to cool the combustion products adjacent the combustion liner wall by heat exchange with air flowing from the said compressed air duct through the heat exchanger; and means for mixing the air heated in the heat exchanger with the combustion products discharged through the said outlet to dilute the combustion products.

12. A combustion apparatus comprising, in combination, an outer casing defining a space for compressed air and an inlet for the compressed air; an inner casing mounted within the outer casing and defining an outlet for combustion products; a combustion liner mounted within the inner casing, the combustion liner having upstream and downstream ends and having a double wall extending between the ends, the space between the walls being a duct for compressed air, the duct terminating in a nozzle at the downstream end of the liner discharging into a recirculation duct defined between the combustion liner wall and the inner casing; the nozzle serving as the impelling means of a jet pump adapted to circulate combustion products flowing from the combustion liner into the recirculation duct; the combustion liner having an entrance for the air and combustion products returned through the recirculation duct at the upstream end of the combustion liner and defining a combustion zone adjacent the upstream end of the liner; means for injecting fuel into the combustion zone; an annular heat exchanger mounted on the inside of the combustion liner wall having an opening through the center of the heat exchanger for combustion products flowing to the said outlet and having means to cool the combustion products adjacent the combustion liner wall by heat exchange with air flowing from the said compressed air duct through the heat exchanger; and means for mixing the air heated in the heat exchanger and air flowing through the space between the outer casing and the inner casing with the combustion products discharged through the said outlet to dilute the combustion products.

13. A combustion apparatus comprising, in combination, an outer casing defining a space for compressed air and an inlet for the compressed air; an inner casing mounted within the outer casing and defining an outlet for combustion products; a combustion liner mounted within the inner casing, the combustion liner having upstream and downstream ends and having a double wall extending between the ends, the space between the walls being a duct for compressed air, the duct terminating in a nozzle directed forwardly of the combustion liner at the downstream end of the liner discharging into a recirculation duct defined between the combustion liner wall and the inner casing; the nozzle serving as the impelling means of a jet pump adapted to circulate combustion products flowing from the combustion liner into the recirculation duct; the combustion liner having an entrance for the air and combustion products returned through the recirculation duct at the upstream end of the combustion liner and defining a combustion zone adjacent the upstream end of the liner; means for injecting fuel into the combustion zone; an annular heat exchanger mounted on the inside of the combustion liner wall having an opening through the center of the heat exchanger for combustion products flowing to the said outlet and having means to cool the combustion products adjacent the combustion liner wall by heat exchange with air flowing from the said compressed air duct through the heat exchanger; and means for mixing the air heated in the heat exchanger and air flowing through the space between the outer casing and the inner casing with the combustion products discharged through the said outlet to dilute the combustion products.

* * * * *